United States Patent [19]

Gold

[11] 4,283,362

[45] Aug. 11, 1981

[54] METHOD AND APPARATUS FOR MAKING A SELF-COILING SHEET

[75] Inventor: Nicholas Gold, Arlington, Mass.

[73] Assignee: Polaroid Corporation, Cambridge, Mass.

[21] Appl. No.: 117,874

[22] Filed: Feb. 4, 1980

[51] Int. Cl.³ .............................................. B29C 17/02
[52] U.S. Cl. .................................... 264/160; 264/281; 264/339; 264/DIG. 40; 425/305.1; 425/363; 425/391; 425/DIG. 5; 425/DIG. 7
[58] Field of Search ............... 264/160, 281, 295, 339, 264/DIG. 40; 425/305.1, 391, DIG. 7, 363

[56] References Cited

U.S. PATENT DOCUMENTS

| 638,090 | 11/1899 | Bryce .................................. 425/391 |
| 901,031 | 10/1908 | Overkamp et al. ................... 425/391 |
| 2,053,811 | 9/1936 | Boyle . |
| 2,402,874 | 6/1946 | Cohen et al. ......................... 425/391 |
| 2,826,523 | 3/1958 | Blaszkowski et al. . |
| 3,370,111 | 2/1968 | Boone . |
| 3,426,115 | 4/1969 | Taber . |
| 3,861,291 | 1/1975 | Guzaski ................................. 425/391 |
| 3,940,774 | 2/1976 | Trester . |
| 3,994,656 | 11/1976 | Van Ausdall ......................... 264/339 |
| 4,072,968 | 2/1978 | Land et al. . |

FOREIGN PATENT DOCUMENTS 658293 of 1965 France .................................... 425/391

Primary Examiner—James B. Lowe
Attorney, Agent, or Firm—Alfred E. Corrigan

[57] ABSTRACT

A method and apparatus for making a self-coiling sheet. The apparatus includes a work station at which a relatively short section of a sheet of flexible material, e.g., crystalline polyethylene terephthalate, is folded upon the remainder of the sheet. The sheet is then advanced onto the carrier plate which, in turn, is mounted for movement toward and away from a gap defined by a pair of superposed pressure-applying rollers. The carrier plate is adapted to deposit the sheet between the rollers such that the folded section of the sheet is located in engagement with one of the rollers and the underlying portion of the sheet is in engagement with the other roller. The rollers are rotated in the same direction so as to drive the folded section of the sheet toward the carrier plate while simultaneously driving the remainder of the sheet in the opposite direction. This action results in the sheet being ejected from the gap of the rollers as a multi-layered generally cylindrical coil having a permanent set. The sheet may be uncoiled and, when left free, will automatically return to its coiled condition.

8 Claims, 4 Drawing Figures

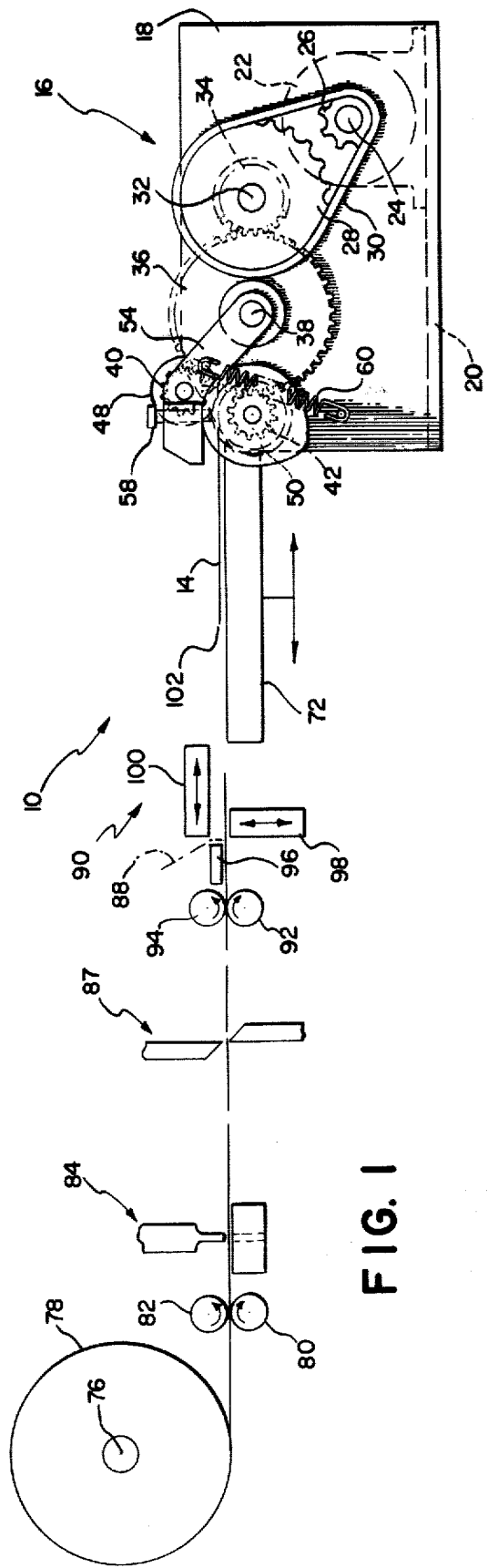
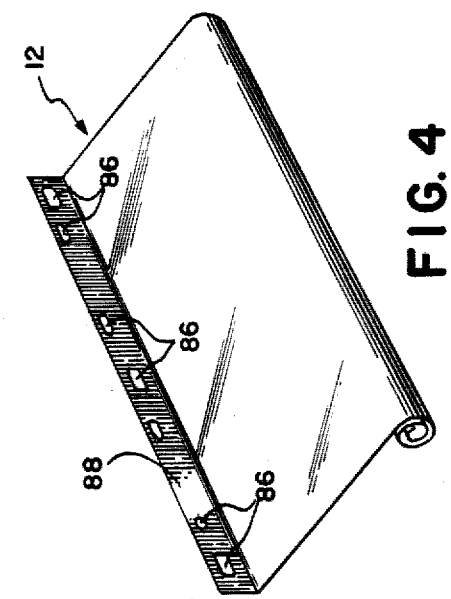
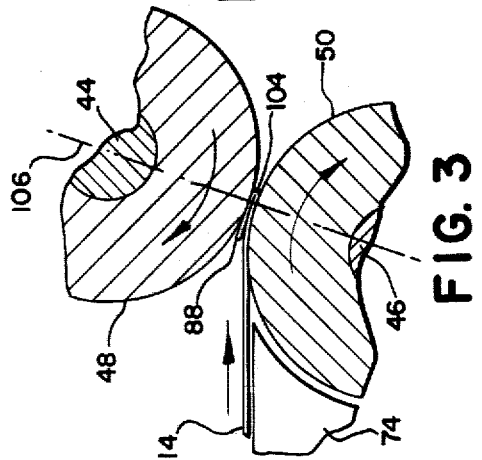
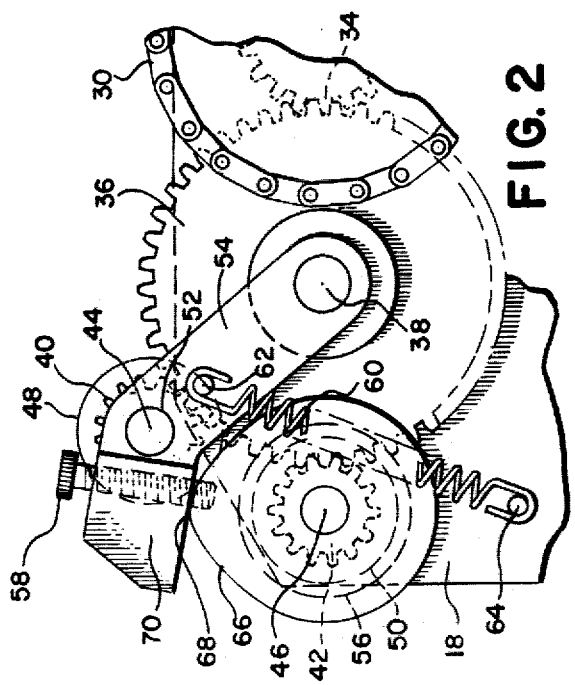
FIG. 1
FIG. 2
FIG. 3
FIG. 4

METHOD AND APPARATUS FOR MAKING A SELF-COILING SHEET

BACKGROUND OF THE INVENTION

1. Field of the Invention

This invention relates to a method and apparatus for making a self-coiling sheet.

2. Description of the Prior Art

The prior art is replete with methods and apparatus for making a self-coiling sheet from a flexible sheet material. For example, U.S. Pat. No. 2,053,811 describes a method and apparatus for making such a sheet by impregnating a sheet of paper, jute, etc., with a binder such as a phenolformaldehyde condensation product. The binder is then curved by the application of heat and pressure to the sheet material. While the material is still hot, it is rolled into a tube of the desired dimensions and is held in such shape until it cools. The resulting product may then be used as a protective shield for electrical conductors which, when applied to the conductor, automatically contracts around the conductor and firmly engages it. Also, see U.S. Pat. No. 2,826,523 wherein a self-coiling protective covering is comprised of a laminated sheet having a plurality of layers, at least one of which is resilient and prestressed before it is bonded to adjacent layers whereby the sheet will roll upon itself tightly and automatically. Still another example is set forth in U.S. Pat. No. 3,426,115 wherein a sheet of crystalline polyethylene terephthalate is rolled into a coil, heated while held in the coiled condition, and then released when the sheet material has cooled. The resulting product may be used as a self-retracting shelf for supporting packaged goods.

Lately, self-coiling sheets have found utility in cameras of the self-developing type wherein they are used to temporarily shield a film unit from the ambient light as it exits from the camera. Examples of the latter may be found in U.S. Pat. Nos. 3,940,774 and 4,072,968. Basically, these self-coiling sheets are made from sheets of Mylar (crystalline polyethylene terephthalate) or Tedlar (polyvinyl fluoride) having a suitable opacifier, e.g., carbon black, therein. The sheets, which are preferably 0.0038 centimeters thick, are rolled into a coil, placed in tubes, and heated to a predetermined temperature for a predetermined period of time. The sheets are then allowed to cool before they are removed from their respective tubes.

From the foregoing, it can be seen that there is room for improvement in the methods and apparatus for making a self-coiling sheet. For example, most, if not all, of the methods described above require a period of time during which the sheet must be maintained in a certain condition until its temperature has declined to a predetermined level. Obviously, this increases the time that it takes to make a self-coiling sheet. Accordingly, it can be seen that there is room for improvement in such methods and apparatus.

SUMMARY OF THE INVENTION

The instant invention relates to a method and apparatus for making a self-coiling sheet from a sheet of flexible material. The apparatus preferably includes a pair of elongate rollers mounted in juxtaposition so as to define a gap therebetween. One of the rollers is rotatably mounted between a pair of arms, which in turn are pivotally mounted to the apparatus so as to enable the one roller to be moved away from the other roller to thereby facilitate the introduction of a section of a sheet of flexible material between the rollers. The two rollers are geared to a common drive gear such that the rollers are driven or rotated in the same direction, i.e., one of the rollers would try to advance an object away from the bite of the rollers while the other roller would attempt to advance the object through the bite of the rollers.

A carrier plate is movably mounted adjacent one side of the gap or bite between the pair of rollers. The carrier plate is adapted to support a sheet of flexible material having a folded section at the end of the sheet closest to the rollers. The flexible material is preferably a polymer such as polyethylene terephthalate or polyvinyl fluoride, paper, metal foil or any other material capable of being given a permanent coil set. The operation of the carrier plate and the one roller are synchronized such that after the one roller has been moved away from the other roller, the carrier plate is moved toward the rollers so as to deposit the folded end of the sheet of flexible material between the spaced rollers. The one roller is then allowed to move back into its original position wherein its surface is in contact with the folded section of the sheet and the other roller is in engagement with the underlying portion of the remainder of the sheet. The resulting friction between the superposed rollers and the portion of the sheet located in the bite between the rollers is sufficient to maintain the sheet in place as the carrier plate is moved away from the rollers. Next, a motor is energized to drive the rollers as described above. So driven, the one roller drives the folded section of the sheet away from the rollers and toward the opposite end of the sheet while the other roller simultaneously drives the underlying portion of the sheet in the opposite direction thereby in effect folding the sheet back upon itself. After the opposite end of the sheet moves out of engagement with the other roller, the sheet emerges from the rollers in a coiled condition. It is believed that this folding action permanently changes the molecular structure of the sheet such that it now has a permanent coiled configuration.

Preferably, the apparatus also includes means for supporting a roll of flexible material, a press for punching mounting apertures in the sheet, a cutter for severing sections of the sheet from the roll and a station whereat a relatively small portion of one end of the severed sheet is folded back upon itself.

An alternative method of making a self-coiling sheet is to secure one side of a double backed adhesive tape to a surface of a work area such as a bench. Next, a sheet of flexible material such as polyethylene terephthalate is positioned over and in contact with the exposed surface of the adhesive tape with an end of the sheet preferably maintained out of contact with the tape so as to facilitate the grasping of the free end. The free end of the sheet is then grasped, either manually or mechanically, and moved in the general direction of the opposite end of the sheet so as to incrementally fold portions of the sheet back upon itself while simultaneously peeling the sheet from the tape which remains secured to the surface of the bench. When the sheet is completely stripped from the tape, it immediately assumes a permanent coiled configuration.

An object of the invention is to provide a method for making a self-coiling sheet from a sheet of flexible material without heating the sheet.

Another object of the invention is to provide an apparatus including a pair of juxtaposed rollers which are adapted to be driven in a manner which advances one portion of a sheet away from the rollers while simultaneously advancing another portion of the sheet toward the rollers whereby a self-coiling sheet is produced.

Other objects of the invention will in part be obvious and will in part appear hereinafter.

The invention accordingly comprises the method involving the several steps and the relation and order of one or more of such steps with respect to each of the others and the apparatus possessing the construction, combination and arrangement of parts which are exemplified in the following detailed disclosure, and the scope of the application of which will be indicated in the claims.

BRIEF DESCRIPTION OF THE DRAWINGS

For a fuller understanding of the nature and objects of the invention, reference should be had to the following detailed description taken in connection with the accompanying drawings wherein:

FIG. 1 is an elevational view, partly schematic, of apparatus for making a self-coiling sheet;

FIG. 2 is an enlarged elevational view of a portion of the apparatus of FIG. 1;

FIG. 3 is an enlarged elevational view of the relationship between a pair of superposed rollers and the folded end of a sheet of flexible material;

FIG. 4 is a perspective view of a self-coiling sheet shown in a partially uncoiled condition;

DETAILED DESCRIPTION OF THE INVENTION

Figure 5:
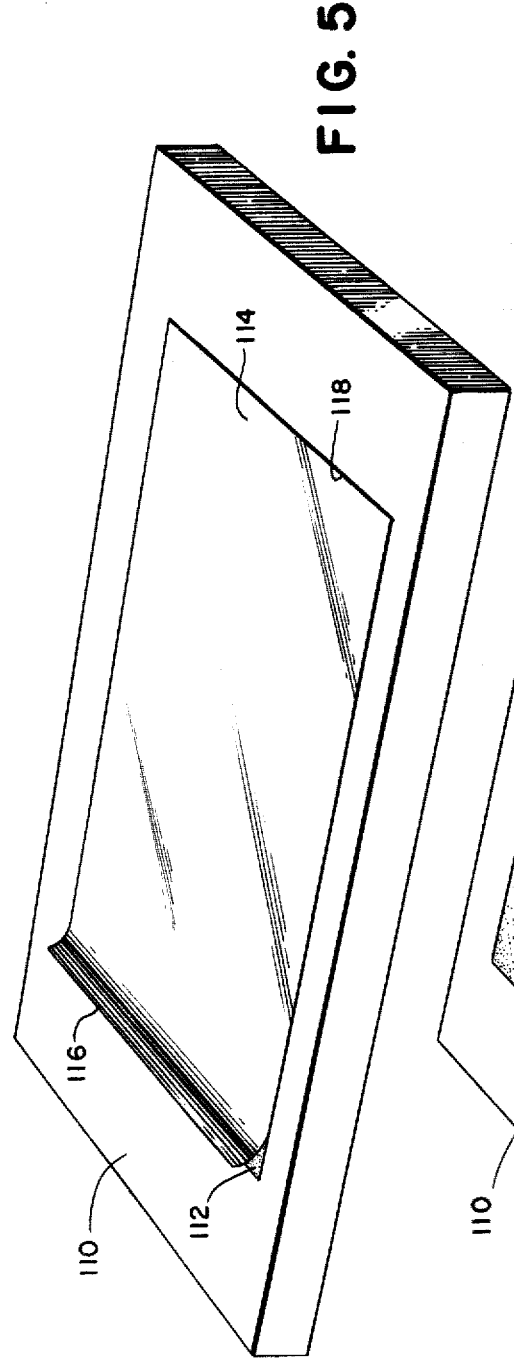
FIG. 5 is a perspective view of a sheet of flexible material adhesively secured to a supporting structure.

Reference is now made to FIGS. 1-3 wherein is shown a preferred embodiment of an apparatus 10 for making a self-coiling sheet 12 (FIG. 4) from a sheet 14 of flexible material. The apparatus 10 includes a housing 16 defined in part by a pair of spaced vertical walls 18 (only one being shown) which, in turn, are interconnected by a bottom wall 20. An electrical motor 22 having an output shaft 24 is suitably secured to the bottom wall 20. The shaft 24 extends through a bearing in one of the walls 18 and is provided at its end with a sprocket 26 which is adapted to transmit its rotation to a second sprocket 28 via a chain 30. The sprocket 30 includes a shaft 32 which is journaled within the side walls 18. A gear 34 is fixedly secured to the shaft 32 and is located in mesh with a larger diameter gear 36. The gear 36 is rotatably mounted on a shaft 38 which is fixedly secured within apertures in the side walls 18. The gear 36 is, in turn, located in mesh with a pair of identical gears 40 and 42 which are located outboard of the walls 18 and are fixedly secured to the journals 44 and 46 of a pair of elongate cylindrical rollers 48 and 50, respectively.

The journals 46 of the roller 50 extend through bearings (now shown) in the side walls 18 while each of the journals 44 of the roller 48 is rotatably received and supported within an aperture 52 located in an arm 54 located on the outboard side of each wall 18. An end of each arm 54 (only one being shown) is rotatably secured to each end of the shaft 38 such that the arms 54 may be rotated in a clockwise manner, as viewed in FIG. 2, to move the roller 48 away from the roller 50. The opposite ends of the roller 48 terminate at a point adjacent the arms 54 while the ends of the roller 50 terminate at a point adjacent the inboard or facing sides of the walls 18. An annular collar 56 (only one being shown) is mounted on each end of the roller 50 directly below each of the arms 54. The collars 56 are identical, are of a larger diameter than the roller 50, and their peripheral surfaces are formed from a material having a low coefficient of friction as compared to the surfaces of the rollers 48 and 50 which are constructed from urethane, rubber or any other suitable material having a high coefficient of friction. The peripheral surfaces of the collars 56 are adapted to be engaged by the lower end of an adjustable gap setting bolt 58 which is threaded through each of the arms 54 so as to determine the minimum thickness of the gap between the rollers 48 and 50 when they are positioned as shown in FIGS. 1 and 3. Preferably, the thickness of the minimum gap between the elongate rollers 48 and 50 is slightly less than twice the thickness of the sheet material being formed into a self-coiling sheet. Also, the roller 48 is resiliently biased toward the roller 50 by a pair of springs 60 (only one shown). One end of each spring 60 is secured to a stud 62 extending outwardly from each of the arms 54 while the opposite end of each spring 60 is attached to a stud 64 extending outwardly from each of the side walls 18.

A cam 66 is fixedly mounted on each end of the journals 46. Each of the cams 66 includes a rise 68 which is adapted to be rotated into and out of engagement with an outwardly extending portion 70 of increased thickness located at the free end of each of the arms 54 during each revolution of the roller 50, thereby moving the roller 48 away from the roller 50 and into the position shown in FIG. 2 and thereafter rotated out of engagement with the portion 70 thereby allowing the springs 60 to return the roller 48 to the position shown in FIG. 1.

The apparatus 10 further includes a carrier plate 72 mounted for reciprocating movement in the direction of the arrows, as shown in FIG. 1. The carrier plate 72 includes a section 74 (see FIG. 3) which has a contour that is complementary to the periphery of the roller 50 so as to enable the carrier plate 72 to move as close as possible to the bite of the rollers 48 and 50. At this point, it should be noted that the bite of the rollers 48 and 50 is the narrowest gap between the rollers 48 and 50 and is located in the same plane as that which contains the axes of the rollers 48 and 50. Also, the length of the rollers is at least equal to the width of the sheet 14 of flexible material and the length of the roller 48 is shorter than that of the roller 50 by approximately twice the thickness of one of arms 54 at the point where the shaft 38 extends therethrough.

The apparatus 10 also includes a roller 76 for supporting a roll of flexible material 78; a first pair of driven rollers 80 and 82 for advancing the flexible material to the right (as viewed in FIG. 1); and a press 84 which is adapted to punch a plurality of mounting apertures 86 in a leading end or folded section 88 of the sheet 14 of flexible material. After the punching operation, the material is advanced by the rollers 80 and 82 to a cutting section 87 whereat a predetermined length or sheet 14 is severed from the remainder of the material. The sheet 14 is then advanced to a folding station 90 by a second pair of driven rollers 92 and 94. The folding station 90 includes a platen 96 about which the leading end 88 of the sheet 14 is folded, a vertically operable member 98 for initially moving the leading end 88 of the sheet 14 into a vertical plane, and a horizontally operable member 100 for folding the thus vertically orientated leading end 88 of the sheet 14 back toward the trailing end 102 of the sheet. Thus folded, the folded leading end section 88 preferably defines an included angle of less than 90° with the remainder of the sheet 14.

Subsequent to the folding of the section 88 of the sheet 14, the rollers 92 and 94 are energized so as to advance the sheet 14 onto the carrier plate 72 such that a portion of the sheet 14 including the folded section 88 and its edge 104 are located to the right of the contoured section 74, as best seen in FIG. 3, and the trailing end 102 of the sheet 14 has just moved out of engagement with the rollers 92 and 94. At this time in the cycle, the rise 68 in the cams 66 have rotated in a clockwise direction into engagement with the arms 54 thereby pivoting the latter in a clockwise direction about the shaft 38 so as to space the roller 48 from the roller 50, as shown in FIG. 2. Simultaneously therewith, the carrier plate 72 is driven toward the bite of the rollers 48 and 50 until it assumes the relationship with the roller 50 shown in FIG. 3. So positioned, the folded section 88 is located between the spaced rollers 48 and 50 with the folded edge 104 of the sheet 14 located just to the right of a plane 106 containing the axes of the rollers 48 and 50. As the cams 66 continue their clockwise rotation, the rise 68 moves out of engagement with the arms 54 thereby permitting the latter to move the roller 48 toward the roller 50 under the influence of the springs 60 until the bottom of the bolts 58 engage the annular collars 56 on the ends of the roller 50. Thus located, the various elements assume the relationship shown in FIG. 3 wherein the radius of curvature of the folded edge 104 is approximately equal to twice the thickness of the sheet 14, the folded section 88 is in frictional engagement with the roller 48 and the underlying portion of the sheet 14 is in frictional engagement with the roller 50. The carrier plate 72 may now be reciprocated away from the bite of the rollers 48 and 50 as the latter commences to fold the section 88 of the sheet 14 back upon itself. Specifically, the roller 50 advances the portion of the sheet 14 in which it is in engagement with to the right, as viewed in FIG. 3, while the roller 48 simultaneously advances the portion of the sheet that it is in engagement with to the left. Immediately after the trailing end 102 of the sheet 14 enters the bite of the rollers 48 and 50, the sheet 14 is ejected from the bite by the roller 48 as a self-coiling sheet with the section 88 located at the center of the coil. The coil 12 may then be fully unwound and allowed to recoil itself with the trailing end 102 located at the center of the coil. The tightness of the coil is a function of the distance between the bite of the rollers 48 and 50 and the leading edge 104 of the sheet 14. The nearer the leading edge 104 is to the bite of the rollers when the folding operation is started the tighter the resulting coil, i.e., the smaller its diameter.

Figure 6:
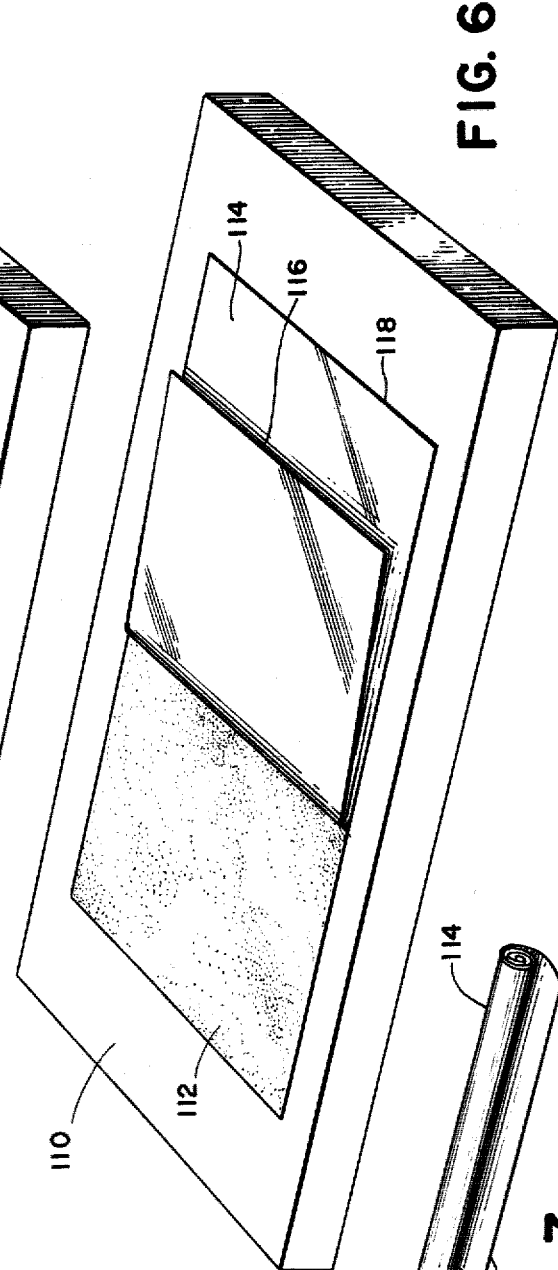
FIG. 6 is a view similar to FIG. 5 showing the sheet of flexible material being folded back upon itself as it is being stripped from the supporting structure.
Figure 7:
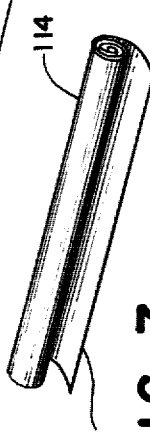
FIG. 7 is a perspective view of the sheet shown in FIGS. 5 and 6 after it has been completely stripped from the supporting structure.

Reference is now made to FIGS. 5-7 of the drawings wherein an alternative method of forming a self-coiling sheet from a sheet of flexible material is depicted. FIGS. 5 and 6 show a support 110 including an adhesive surface 112 which may be a sheet of double faced adhesive tape. A sheet of flexible material 114, of the type described supra, is first cut to the length required in an uncoiled condition, and is then laid in contact with the adhesive surface throughout substantially its entire area except for an end portion 116. The end portion 116 is then grasped, either manually or mechanically, and moved in the direction of the arrow toward the opposite end 118 of the sheet material 114 to progressively strip the sheet material 114 from the adhesive surface 112. When the end 118 of the sheet material 114 is stripped from the adhesive surface 112, it immediately assumes the coiled condition shown in FIG. 7. The tightness of the coil is a function of the included angle between the end portion 116 and the remainder of the sheet material 114. For example, when the end portion 116 defines a very small angle, e.g., 1°, with the remainder of the sheet material 114, as shown in FIG. 6, the coil is very tight and, therefore, has a smaller diameter than it would have had if the angle had been greater.

Since certain changes may be made in the above method and apparatus without departing from the scope of the invention herein involved, it is intended that all matter contained in the above description or shown in the accompanying drawings shall be interpreted as illustrative and not in a limiting sense.

What is claimed is:

1. A method of making a self-coiling sheet comprising:
    cutting a length of a sheet of flexible material, capable of being given a permanent coil set, to the size required of said sheet in an uncoiled condition;
    folding a section of said sheet back upon a portion of the remainder of said sheet so as to define a folded edge extending across the sheet and having a radius of curvature substantially equal to the thickness of said sheet; and
    advancing said section of said sheet in a direction away from said folded edge of said sheet and toward the opposite end of said sheet while substantially maintaining said radius of curvature, whereby is produced a multi-layered generally cylindrical coil having a permanent set which may be uncoiled and, when left free, will automatically return to its coiled condition.

2. A method as defined in claim 1 wherein said flexible material is essentially comprised of polyethylene terephthalate.

3. Apparatus for making a self-coiling sheet from a sheet of flexible material capable of being given a permanent coil set, comprising:
    first and second elongate rollers mounted in juxtaposed relation so as to define a gap therebetween;
    means for supporting a sheet of flexible material having a folded section at one end thereof which extends from a folded edge and is terminated by a free end of the sheet;
    means for moving said supporting means toward said gap so as to deposit the sheet of flexible material between said rollers with the folded section of the sheet located in engagement with said first roller and with its free end directed away from said first and second rollers and toward the opposite end of the sheet, and with the adjacent section of the remainder of the sheet located in engagement with said second roller; and
    means for rotating said first roller in a direction so as to advance the folded section of the sheet in the direction of the opposite end of the sheet, and said second roller in a direction so as to advance the remainder of the sheet in the opposite direction, whereby is produced a multi-layered generally cylindrical coil having a permanent set which may be uncoiled and, when left free, will automatically return to its coiled condition.

4. Apparatus as defined in claim 3 further including means for folding the section of the sheet prior to the sheet being deposited in said gap defined by said first and second rollers.

5. Apparatus as defined in claim 3 further including means for mounting said first roller for movement toward and away from said second roller to thereby facilitate the deposit of the folded section of the sheet between said rollers.

6. Apparatus as defined in claim 5 further including means for resiliently biasing said first roller toward said second roller, and means for automatically moving said first roller away from said second roller prior to said supporting means depositing the sheet between said rollers and for allowing said resilient means to return said first roller to its original position after the sheet has been deposited between said rollers.

7. Apparatus as defined in claim 6 further including means for adjusting the gap between said rollers.

8. Apparatus as defined in claim 6 wherein said supporting means is adapted to deposit the sheet between said rollers with the folded edge of the sheet located just beyond a plane containing the axis of said rollers.

* * * * *